United States Patent [19]
Garver et al.

[11] Patent Number: 5,851,565
[45] Date of Patent: Dec. 22, 1998

[54] NOZZLE ASSEMBLY FOR INJECTION MOLDING APPARATUS

[75] Inventors: Jerry L. Garver, Paradise; Gerald D. Hudack, Sinking Spring, both of Pa.

[73] Assignee: Exide Corporation, Reading, Pa.

[21] Appl. No.: 797,732

[22] Filed: Feb. 11, 1997

[51] Int. Cl.$^6$ .............................. B29C 45/20; B29C 45/74
[52] U.S. Cl. ................ 425/190; 264/328.15; 425/192 R; 425/549
[58] Field of Search ...................................... 425/547, 548, 425/549, 190, 192 R; 264/328.15

[56] References Cited

U.S. PATENT DOCUMENTS

| | | | |
|---|---|---|---|
| 3,010,155 | 11/1961 | Gilmore . | |
| 3,707,265 | 12/1972 | Seres . | |
| 4,266,723 | 5/1981 | Osuna-Diaz | 425/549 |
| 4,273,525 | 6/1981 | Reitan | 425/549 |
| 4,345,892 | 8/1982 | Schulte et al. | 425/549 |
| 4,613,296 | 9/1986 | Nagasaka | 425/549 |

FOREIGN PATENT DOCUMENTS

| | | | |
|---|---|---|---|
| 2940818 | 4/1981 | Germany | 425/459 |
| 3001017 | 7/1981 | Germany | 425/459 |

OTHER PUBLICATIONS

Fast Heat Inc. flyer, Elite SV Series Bushings, undated.
Incoe Corporation Series 3300J spec sheet, undated.
Polyshot brochure, Polyshot™ Tip Styles, undated.
Thermoplay spec sheet, Type D1, undated.

*Primary Examiner*—Patrick Ryan
*Assistant Examiner*—Joseph Leyson
*Attorney, Agent, or Firm*—Nixon & Vanderhye P.C.

[57] ABSTRACT

A nozzle assembly for use with injection molding apparatus includes an outer sleeve having a relatively large bore extending from an open rearward end forwardly to a substantially closed forward end, and having an injection orifice therein. An inner nozzle tip is located within the sleeve, and has a radial flange and an internal extending from a rearward open end to a forward tip having a plurality of flow orifices upstream of the injection orifice. A manifold insert is located within the outer sleeve and includes a through bore in axial alignment with the bore of the nozzle tip. The manifold insert has a forward end which receives the nozzle tip and which abuts the radial flange. A coil heater is located radially between the manifold and the outer sleeve, a forward end of the coil heater seated on the radial flange. The manifold insert, nozzle tip and coil heater form a subassembly which is easily removed and reinserted vis-a-vis the outer sleeve.

9 Claims, 3 Drawing Sheets

NOZZLE ASSEMBLY FOR INJECTION MOLDING APPARATUS

TECHNICAL FIELD

This invention relates to a replacement nozzle assembly for an injection molding machine.

BACKGROUND PRIOR ART

In a typical injection molding process, plastic resin is fed to a rotating screw in a heated barrel where the plastic is melted and mixed. The resulting hot plastic is then injected at high pressure into a mold that has one or more cavities that define the shape of the desired part. After injection, the mold is cooled to solidify the plastic. Subsequently, the mold is opened and the formed parts are ejected.

During the injection process, the melted resin is injected into a network of flow channels generally referred to as the runner system. The runner system maintains and controls the temperature of the melt through the use of sprue heaters, manifold heaters and nozzle heaters. The nozzle assemblies often incorporate cartridge heaters, and in some instances, these heaters have been subject to failures which have been difficult to trace and repair.

A second problem with existing nozzle assemblies is the amount of time required to replace a failed heater unit. In other words, regardless of whether a cartridge or coil type heater is employed, some nozzle designs require that certain components first be unsoldered. After replacement, those same components must be cleaned and re-soldered in place. The time necessary to implement this procedure is unacceptably high.

DISCLOSURE OF THE INVENTION

The present invention provides a replacement nozzle assembly that eliminates the need for a cartridge heater and reduces the amount of time required to replace a failed heater within the nozzle assembly. More specifically, the nozzle assembly includes an outer sleeve, an inner nozzle, a coil heater and an internal T-stem manifold through which molten material flows to the nozzle. The inner nozzle tip is threadably secured to the forward end of the T-stem and the coil heater is received over the T-stem manifold, between a forward radial shoulder on the inner nozzle and a rearward radial cap flange on the T-stem manifold. This sub-assembly, comprising the manifold, nozzle tip and coil heater, is slidably received within the outer sleeve, and a screw fastener is inserted between the rearward radial flange of the T-stem manifold and the outer sleeve. With this arrangement, there is no need for soldering and un-soldering components of the assembly to effect installation and/or removal. Rather, the manifold is easily removed from the outer sleeve, along with the nozzle tip and coil heater, simply by removing the screw fastener and sliding the manifold (with the nozzle tip and the coil heater) out of the sleeve.

Thus, in accordance with an exemplary embodiment of the invention, there is provided a nozzle assembly for use with injection molding apparatus comprising an outer sleeve having a relatively large bore extending from an open rearward end forwardly to a substantially closed forward end having an injection orifice therein; an inner nozzle tip having a radial flange, the nozzle tip having a bore extending from a rearward open end to a forward tip having a plurality of flow orifices upstream of the injection orifice; a manifold insert located within the outer sleeve and including a through bore in axial alignment with the bore of the nozzle tip, the manifold insert having a forward end which receives the nozzle tip and which abuts the radial flange; and a coil heater located radially between the manifold insert and the outer sleeve, a forward end of the coil heater seated in the radial flange.

In accordance with another aspect, the invention provides a nozzle assembly for an injection molding apparatus, the nozzle assembly having an outer sleeve, a forward end of which is formed with an orifice, and a rearward end of which is substantially open; and a subassembly slidably receivable within the outer sleeve, the subassembly including a molten material manifold insert, a nozzle tip removably secured to the manifold at a forward end thereof and a coil heater received over the manifold and engaged by a flange on the nozzle tip; the manifold having a cap flange at a rearward end thereof adapted for releasable attachment to the outer sleeve.

Other objects and advantages of the invention will become apparent from the detailed description which follows.

BEST MODE FOR CARRYING OUT THE INVENTION

Figure 1:
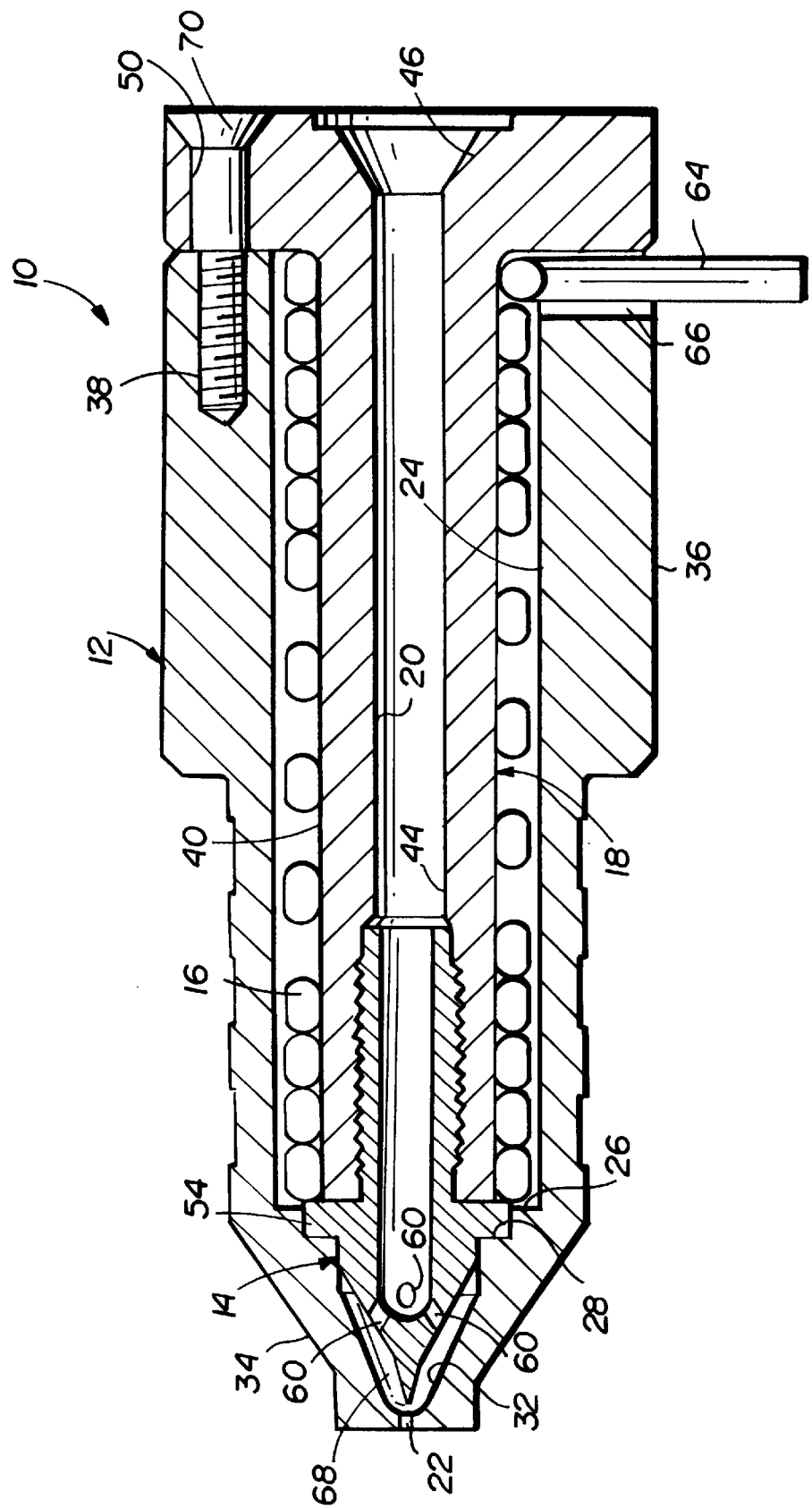
FIG. 1 is a cross section through an injection molding nozzle assembly in accordance with the invention.
Figure 5:
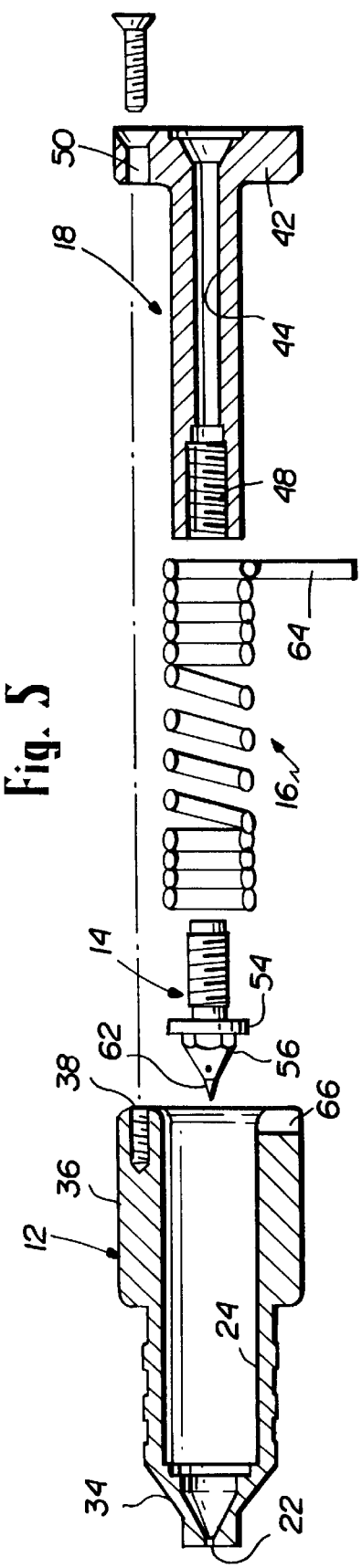
FIG. 5 is an exploded side cross section of the nozzle assembly shown in FIG. 1.

Referring especially to FIGS. 1 and 5, the injection molding nozzle assembly 10 in accordance with an exemplary embodiment of the invention includes a generally cylindrical outer sleeve 12, an inner nozzle tip 14, a coil heater 16 and a T-stem manifold insert 18. The T-stem manifold insert 18 has an internal bore 20 through which molten material is supplied to the inner nozzle tip 14, and from which the material is supplied to a chamber between the inner nozzle 14 and the sleeve 12. The latter is formed with a single orifice 22 from which the material is expelled into a mold in an injection molding process.

Figure 2:
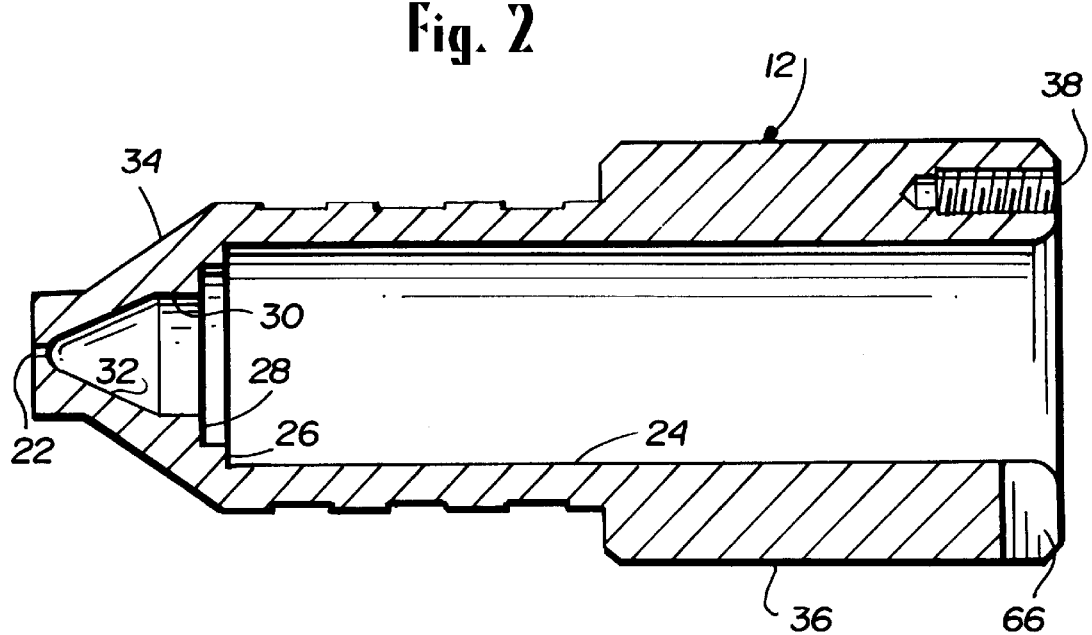
FIGS. 2, 3 and 4 are individual cross sections of the various components included in FIG. 1.

Turning now to FIG. 2, the sleeve 12 has an internal bore 24 extending axially from the open rearward end 26 of the sleeve, forwardly to the orifice 22. At the forward end of the sleeve, the bore 24 is stepped down via annular shoulders 26, 28 to a smaller diameter portion 30 which, in turn, leads to a conical wall 32 which terminates at its apex with the orifice 22.

The outer surface of the sleeve is generally cylindrical, with a forward tapered end 34 and a diametrically enlarged portion 36 extending over approximately the rearward half of the sleeve. A threaded hole 38 is formed in the rear face of the sleeve for a purpose explained below.

Figure 3:
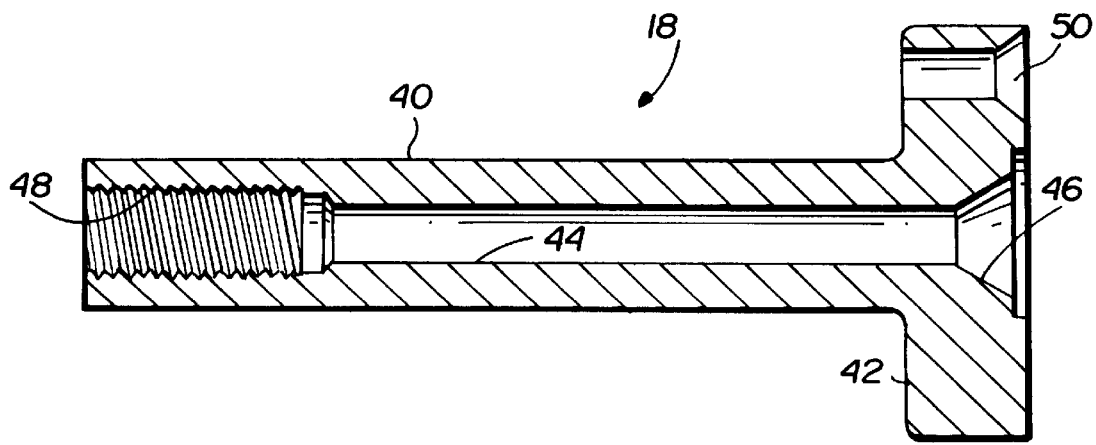

With reference to FIG. 3, the internal T-stem manifold insert 18 is formed with an elongated stem body 40 and a radial cap flange 42 at its rearward end. The manifold insert 18 has an internal through bore 44 extending from an enlarged inlet portion 46 forwardly to a threaded counterbore portion 48 at the forward end thereof. A fastener hole 50 is provided in the cap flange 42 and is alignable with the hole 38 in the rearward end of the sleeve 12.

Figure 4A:
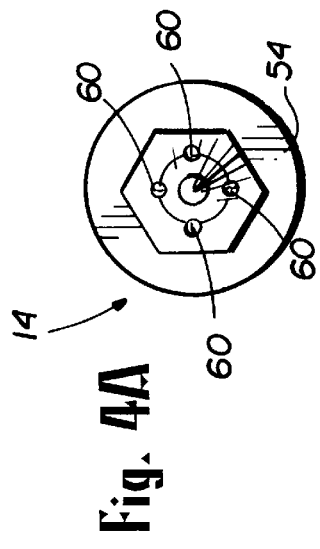
FIG. 4A is a front end elevation of the nozzle tip.
Figure 4:
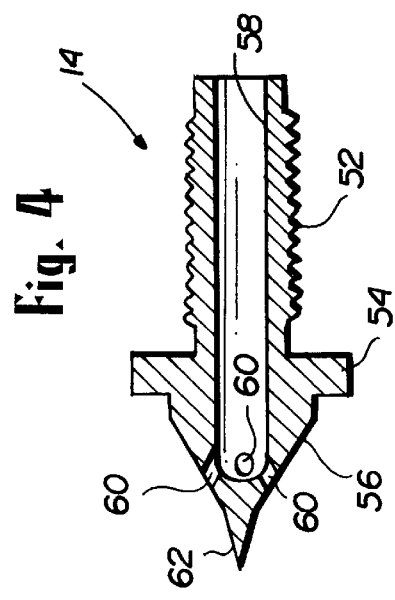

The threaded forward portion 50 is adapted to threadably receive the inner nozzle tip 14, best seen in FIG. 4. The nozzle tip 14 is threaded on an exterior surface 52, located rearwardly of a radial flange 54. Ahead of the flange 54 is a pointed end 56. A bore 58 extends from the rearward end forwardly to a plurality (four, as shown) of orifices 60, arranged in a circle about the forward tip 62. With reference to FIG. 5, it may be seen that the nozzle tip 14 is threadably secured to the forward threaded end 48 of the T-stem manifold insert 18 with one side of the radial flange 54 seated on the shoulder 28, and the outer side engaged with the forward face of the T-stem manifold insert 18, and with bore 58 axially aligned with bore 44. The fully seated engagement of the radial flange 54 on the sleeve shoulder prevents any molten material from entering the radial space between the sleeve 12 and the manifold insert 18 and escaping through the notch 66 (described below).

The coil heater 16 is receivable over the stem body 40 and has an axial length substantially equal to the stem body 40. A lead portion 64 of the heater 16 extends radially outwardly for connection to a lead wire or the like. The T-stem manifold insert 18, inner nozzle tip 14 and coil heater 16 are then slidably received within the sleeve 12, with the coil heater 16 taking up most of the radial space between the T-stem manifold 18 and the inner surface of the outer sleeve 12. The lead 64 of the coil heater 64 is received in a radial notch or recess 66 formed in the rearward face of the sleeve 12.

In the assembled state shown in FIG. 1, the forward radial flange 54 of the inner nozzle tip 14 is seated on the radial shoulder 28 of the sleeve 12, with the forward end of the inner nozzle received in the tapered forward end of the sleeve, thus creating an annular chamber 68. The latter receives molten plastic through the orifices 60, and the plastic is then expelled from the chamber via the single orifice 22. Note that the tip 62 of the inner nozzle 14 is located closely adjacent the orifice 22. With the component parts assembled as described, a threaded screw fastener 70 is employed to secure the T-stem manifold insert 18 to the sleeve 12 via aligned holes 38 and 50.

With the above arrangement, it will be appreciated that, if the coil heater 16 fails, replacement is easily achieved simply by removing the fastener 70 and the subassembly which includes the T-stem manifold 18, the inner nozzle tip 14 and the coil heater 16. In other words, since the coil heater abuts the radially outermost portion of the radial flange 54 on the inner nozzle tip 14, the coil heater 16 is removed with the manifold 18 and nozzle tip 14. Note that the open notch 66 makes it possible for the heater to be removed from the sleeve. Then, the inner nozzle tip 14 can be unthreaded from the T-stem manifold 18 and the coil heater removed from the body 40 of the manifold. Replacement and reassembly is carried out with a simple reversal of the steps noted above. It will also be appreciated that with construction as described hereinabove, there are no parts to solder and un-solder during the assembly/disassembly process.

In accordance with the preferred embodiment, the sleeve 12 and manifold insert 18 may be stainless steel, while the nozzle tip 14 is beryllium copper. The coil heater 16 may be of any suitable design, e.g., a 240 volt coil heater made by RAMA Corp. and available through Plastic Process Equipment Inc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nozzle assembly for use with injection molding apparatus comprising an outer sleeve having a relatively large bore extending from an open rearward end forwardly to a substantially closed, tapered forward end having an injection orifice therein; an inner nozzle tip having a nozzle bore, and including an annular radial flange seated on an annular shoulder formed within said tapered end of said sleeve, a mounting portion extending rearwardly of said flange, and a forward tip portion extending forwardly of said flange, said forward tip portion having a plurality of flow orifices communicating with said nozzle bore and located upstream of, and in communication with, said injection orifice; a manifold insert located within said outer sleeve and including a through bore in axial alignment with said nozzle bore, said manifold insert having a forward end which receives said mounting portion of said nozzle tip and which abuts said radial flange; and a coil heater located radially between said manifold insert and said outer sleeve, a forward end of said coil heater seated on said annular radial flange.

2. The nozzle of claim 1 wherein said manifold insert is formed with a radial cap flange at a rearward end thereof, said radial cap flange abutting said rearward end of said outer sleeve, and further wherein at least one fastener extends through said radial cap flange of said insert into said outer sleeve, so that said manifold insert, nozzle tip and coil heater are removable from said outer sleeve.

3. The nozzle of claim 1 wherein a rearward end of said coil heater abuts said radial cap flange.

4. The nozzle of claim 1 including a chamber formed between said inner nozzle tip and said outer sleeve, forward of said radial flange.

5. The nozzle of claim 2 wherein said coil heater includes a lead extending substantially radially out of an open notch in said sleeve, said notch closed by said cap flange.

6. A nozzle assembly for an injection molding apparatus, said nozzle assembly having an outer sleeve, a forward end of which is formed with an orifice, and a rearward end of which is substantially open; and a subassembly slidably receivable within said outer sleeve, said subassembly including a molten material manifold, a nozzle tip removably secured to the manifold at a forward end thereof and a coil heater received over the manifold and engaged by a radial flange on said nozzle tip; said manifold having a cap flange at a rearward end thereof adapted for releasable attachment to said outer sleeve.

7. The nozzle of claim 6 wherein said outer sleeve is formed with a forward annular shoulder on which the radial flange on the nozzle tip is seated.

8. The nozzle of claim 6 including a chamber formed between said nozzle tip and said outer sleeve, forward of said radial flange.

9. The nozzle of claim 6 wherein said coil heater includes a lead extending substantially radially out of an open notch in said sleeve, said notch closed by said cap flange.

* * * * *